United States Patent Office 2,963,476
Patented Dec. 6, 1960

2,963,476
2,3-DIHYDRO-1,4-THIAZINE-3-ONES AND THE PROCESS OF PREPARATION

George de Stevens, New Providence, N.J., assignor to Ciba Pharmaceutical Products, Inc., Summit, N.J., a corporation of New Jersey No Drawing. Filed July 2, 1957, Ser. No. 669,451

10 Claims. (Cl. 260—243)

This invention relates to a new series of 2,3-dihydro-1,4-thiazine-3-ones. More particularly, this invention concerns 2-$R_1$-4-R-5,6-alkylene-2,3-dihydro-1,4-thiazine-3-ones of the formula:

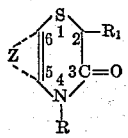

in which Z stands for an alkylene radical and R and $R_1$ each for hydrogen or organic radicals, and process for the preparation of such compounds.

In the compounds of the above formula an alkylene radical Z contains primarily from 3 to 5 carbon atoms in the alkylene chain, i.e. is represented by the trimethylene, tetramethylene and pentamethylene radicals. Such lower alkylene radicals are preferably unsubstituted or may contain as substituents lower hydrocarbon radicals containing from 1 to 10 carbon atoms, such as lower alkyl radicals, e.g. methyl or ethyl; lower alkenyl radicals, e.g. allyl; lower cycloalkyl radicals, e.g. cyclopentyl or cyclohexyl; lower alkylene radicals, e.g. methylene, dimethylene, 2,2-propylene, trimethylene or tetramethylene, which may be attached to one carbon atom forming a spiro ring, or to two different carbon atoms producing a fused-on or an endo ring; lower aryl radicals, e.g. phenyl, which radical may also be fused-on to the alkylene ring; or lower aralkyl radicals, e.g. benzyl.

The substituent R in the 4-position of the 2,3-dihydro-1,4-thiazine-3-ones of this invention stands for hydrogen or for an organic radical, especially for a lower hydrocarbon radical which is unsubstituted or may be substituted by functional groups, such as a nitro group, an amino group, e.g. a primary, secondary or tertiary amino group; a hydroxyl group, e.g. a free, etherified or esterified hydroxyl group; or a halogen atom, e.g. chlorine or bromine. Such lower hydrocarbon radicals contain from 1 to 10 carbon atoms and are represented by alkyl radicals, e.g. methyl, ethyl, propyl, isopropyl or butyl; alkenyl radicals, e.g. allyl; alkinyl radicals, e.g. propargyl; cycloalkyl radicals, e.g. cyclopentyl or cyclohexyl; cycloalkyl-lower alkyl radicals, e.g. cyclopentylpropyl or cyclohexylethyl; aryl radicals, e.g. phenyl, tolyl or naphthyl; or aralkyl radicals, e.g. benzyl or phenyl-ethyl. Lower hydrocarbon radicals substituted by a functional group are, for example, tertiary amino-lower alkyl such as N,N-di-lower alkyl-amino-lower alkyl radicals, e.g. 2-dimethyl- or 2-diethylamino-ethyl, 2-dimethyl-amino-propyl or 3-dimethylamino-propyl radicals, or N,N-lower alkylene-imino-lower alkyl radicals, in which the N,N-lower alkylene-imino group stands, for example, for a pyrrolidino, a piperidino e.g. piperidino, 3-methyl-piperidino or 4-methyl-piperidino; a morpholino, a thiamorpholino or a piperazino e.g. 4-methyl-, 4-hydroxyethyl or 4-acetoxyethyl-piperazino, radical.

The substituent $R_1$ in the 2-$R_1$-4,5,6-alkylene-2,3-dihydro-1,4-thiazine-3-ones stands primarily for hydrogen or also for an organic radical such as an unsubstituted or substituted lower hydrocarbon radical, for example, one of those outlined hereinbefore for the substituent R.

2-$R_1$-4-R-2,3-dihydro-1,4-thiazine-3-ones in which R and/or $R_1$ represent a lower hydrocarbon radical containing a salt forming group, e.g. an amino group, may be obtained in the form of their therapeutically useful acid addition salts, especially those salts formed with inorganic acids, such as hydrohalic acids, e.g. hydrogen chloride or hydrogen bromide; sulfuric, phosphoric or thiocyanic acid; or organic acids, e.g. acetic, propionic, tartaric, lactic, malonic, maleic or malic acid and the like.

2-$R_1$-4-R-2,3-dihydro-1,4-thiazine-3-ones in which R and/or $R_1$ represent a lower hydrocarbon radical containing a tertiary amino group may also form quaternary ammonium compounds, such as those with lower hydrocarbon halides, especially lower alkyl halides, such as methylchloride, methylbromide, methyliodide, ethylbromide, ethylchloride or the like; or those with di-lower hydrocarbon sulfates, such as di-lower alkyl sulfates, e.g. dimethyl or diethyl-sulfate.

The 2-$R_1$-4-R-5,6-alkylene-2,3-dihydro-1,4-thiazine-3-ones of this invention show analgesic activity and are intended to be used as medicaments for the alleviation of pain. A pronounced analgesic activity is exerted by 2,3-dihydro-1,4-thiazine-3-one derivatives which are unsubstituted in the 4-position or are substituted by a lower hydrocarbon or a tertiary-amino-lower alkyl radical especially by the compounds of the formula

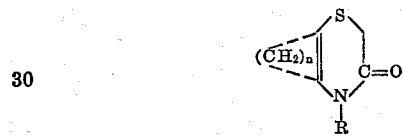

in which $n$ is a whole number from 3 to 5 and wherein R stands for hydrogen or lower alkyl, e.g. methyl or ethyl.

The compounds of this invention can be used as medicaments in the form of pharmaceutical preparations, which contain the new compounds in admixture with a pharmaceutical organic or inorganic solid or liquid carrier suitable for enteral or parenteral administration. For making up the preparations there can be employed substances which do not react with the new compounds, such as water, gelatine, lactose, starches, magnesium stearate, talc, vegetable oils, benzyl alcohols, gums, polyalkylene glycols, petroleum jelly, cholesterol or any other known carrier for medicaments. The pharmaceutical preparations may be, for example, in the form of tablets, dragees, or in liquid form as solutions or emulsions. If desired, they may contain auxiliary substances, such as, for example, preserving agents, stabilizing agents, salts for varying the osmotic pressure or buffers. They may also contain, in combination, other therapeutically useful substances. The new compositions contain preferably from 0.05 mg. to about 300 mg. of the new active compounds per dosage unit. The actual dose administered in therapy depends largely on the condition of the individual patient and the desires of the practicing physician.

The new compounds of this invention may be prepared by treating a 2-halogeno-cycloalkanone, which contains from 5 to 7 ring carbon atoms, and which contains no additional substituents or may be substituted by lower hydrocarbon radicals, with an N-R-2-$R_1$-thiolglycolic acid amide, in which R and $R_1$ have the above given meaning, and if desired converting any resulting 2-$R_1$-5,6-alkylene-2,3-dihydro-1,4-thiazine-3-one having an unsubstituted ring nitrogen atom into a 2-$R_1$-4-R-5,6-alkylene-2,3-dihydro-1,4-thiazine-3-one, in which R stands for an organic radical.

2-halogeno-cycloalkanones as outlined above are more especially those in which the halogeno group is represented by a halogen atom having a molecular weight greater than 12, e.g. chlorine, bromine or iodine.

Illustrating the generally applicable process is, for example, the reaction between a 2-halogeno-cycloalkanone and an N-R-thiolglycolic acid amide of the respective formulae:

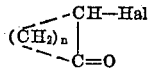

and

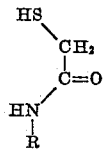

in which $n$ stands for a whole number from 3 to 5, Hal for chlorine or bromine, and R for hydrogen, lower hydrocarbon, such as lower alkyl, e.g. methyl or ethyl; or tertiary amino-lower alkyl to form the 2,3-dihydro-1,4-thiazine-3-one of the formula:

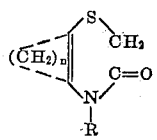

and, if desired, replacing R, when standing for hydrogen, with a lower hydrocarbon, such as a lower alkyl, e.g. methyl or ethyl; or a tertiary amino-lower alkyl radical. Thus, the 2-chloro-cyclohexanone, when reacted with thiolglycolic acid amide yields the 1,4-thiazine-3-one of the formula:

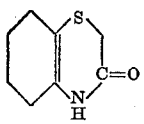

which, if desired, may be converted into the 4-lower alkyl derivative thereof, e.g. the 4-methyl derivative of the formula:

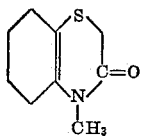

The reaction is carried out in the absence or presence of a solvent, such as, for example, an alcoholic solvent, e.g. ethanol or propanol; at room temperature or preferably at an elevated temperature, for example, from 40° to 250° C.; in an open vessel at atmospheric pressure or in a closed container under increased pressure; and/or, if desired, in the presence of an inert gas, such as nitrogen.

$2-R_1-4-R-5,6$-alkylene - 2,3 - dihydro - 1,4 - thiazine-3-ones obtained according to the above process, in which R represents hydrogen, may be converted into the corresponding 1,4-thiazine-3-ones which are substituted in the 4-position by organic radicals, especially a lower hydrocarbon radical, or a tertiary amino-lower hydrocarbon radical, such as those outlined hereinbefore. It has been found that the introduction of such radicals is preferably carried out by reacting a metal salt, such as an alkali metal, e.g. sodium or potassium salt of a $2-R_1-5,6$-alkylene-2,3-dihydro-1,4-thiazine-3-one having an unsubstituted ring nitrogen atom with a reactive ester of a hydroxylated organic radical, especially a hydroxylated lower hydrocarbon or a hydroxylated tertiary amino-lower hydrocarbon, with a strong acid. Such reactive ester groups are formed by an alcoholic hydroxyl group and a strong acid especially a strong mineral acid, such as a hydrohalic acid, e.g. hydrochloric, hydrobromic or hydriodic acid; or sulfuric acid, or a strong organic acid, e.g. p-toluene-sulfonic or p-bromobenzene-sulfonic acid. Thus, lower alkyl halides, e.g. methylchloride, methylbromide, methyliodide, ethylchloride, propylchloride, isopropyl- chloride, benzylchloride, dimethylamino-ethylchloride, 2-dimethylamino-propylchloride, 3 - dimethylamino-propylchloride and the like may be reacted with an alkali metal, e.g. sodium or potassium, salt of the $2-R_1-5,6$-alkylene-2,3-dihydro-1,4-thiazine-3-one. Such salts may be prepared by reaction of the N-unsubstituted 1,4-thiazine-3-one derivative with a salt-forming reagent; preferred for this purpose in an alkali metal hydride, e.g. sodium hydride, and the preparation of such salts is conveniently carried out by reacting the 1,4-thiazine-3-one with the metal hydride in an aromatic hydrocarbon solvent, e.g. benzene, toluene or xylene.

The starting materials used in the above reaction are known or may be prepared according to processes analogous for the known starting materials. Thus, the 2-halogeno-cycloalkanones are prepared by halogenation, e.g. chlorination or bromination, of the corresponding cyclic ketones; an iodine atom may be also introduced by exchange of a chlorine or bromine atom already present, for example, with silver iodide. The $2-R_1-N-R$-thiolglycolic acid amides may be prepared, for example, by treating an ester, such as the methyl or ethyl ester of a thiolglycolic acid with ammonia or a primary amine of the formula $R-NH_2$, wherein R has the above meaning.

$2-R_1-4-R-5,6$-alkylene-2,3-dihydro-1,4-thiazine-3-ones of this invention in which R and/or $R_1$ represent lower hydrocarbon radicals containing a salt-forming functional group, for example, an amino group, may be obtained in the form of their free bases or as salts. Salts may be converted into the free base by conventional methods, such as treatment with aqueous alkali metal hydroxide, e.g. aqueous sodium hydroxide. Salts may be obtained from bases, for example, by reacting the latter with one of the acids previously mentioned, preferably in an alcoholic, e.g. methanolic or ethanolic, solution.

Furthermore, $2-R_1-4-R-5,6$-alkylene-2,3 - dihydro - 1,4-thiazine-3-ones, in which R and/or $R_1$ are substituents containing a tertiary amino group may be converted into quaternary ammonium compounds thereof, by reacting the tertiary bases, for example, with a lower alkyl halide, e.g. methyl iodide, methylbromide, methylchloride, or ethylchloride; or a di-lower alkylsulfate, e.g. dimethyl or diethylsulfate. The quaternizing reaction is preferably performed in the presence of a solvent such as an alkanol, e.g. methanol or ethanol; or an alkanoic acid amide, e.g. formamide or dimethylformamide.

The invention also comprises any modification of the general process wherein a compound obtainable as an intermediate at any stage of the process is used as starting material and the remaining step(s) of the process is (are) carried out, as well as any new intermediates.

In the process of this invention such starting materials are preferably used which lead to final products mentioned in the beginning as preferred embodiments of the invention.

The following examples are intended to illustrate the invention. They are not to be construed as limitations thereon. Temperatures are given in degrees centigrade.

*Example 1*

To 13.3 g. of 2-chlorocyclohexanone is slowly added an equivalent amount of thiolglycolic acid amide while stirring; the temperature rises to 50° and is maintained at that level. After the evolution of gaseous hydrogen chloride has ceased the reaction mixture is allowed to stand for one half hour at room temperature. Water is added and the formed crystalline product is filtered off. After recrystallization from ethanol the 5,6-tetramethylene-2,3-dihydro-1,4-thiazine-3-one of the formula:

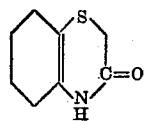

melts at 175–177°.

Example 2

To 14.7 g. of 2-chlorocyclopentanone is added 14.7 g. of thiolglycolic acid amide, whereby gaseous hydrogen chloride is evolved and the temperature rises to 60 to 70° at which level it is maintained about a half hour. After standing for one additional hour at room temperature, water is added to the solid mass and an oil separates which crystallizes, and the crystalline material is removed by filtration. The 5,6-trimethylene-2,3-dihydro-1,4-thiazine-3-one of the formula:

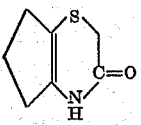

is recrystallized from ethanol, M.P. 142–144°.

Example 3

To 0.8 g. of 2-chlorocycloheptanone is slowly added 10.8 g. of thiolglycolic acid amide, whereby the temperature rises to 70°; the reaction mixture is allowed to stand for one hour at room temperature. Water is added and after decanting the water, the resulting oil crystallizes and is recrystallized from ethanol to give the 5,6-pentamethylene-2,3-dihydro-1,4-thiazine-3-one of the formula:

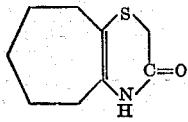

M.P. 102–105°.

Example 4

To a solution of 3.8 g. of 5,6-tetramethylene-1,4-thiazine-3-one in 100 ml. of boiling toluene is added 0.48 g. of sodium hydride, and the mixture is refluxed for one-half hour. 2.43 g. of 2-dimethylaminopropylchloride is added and refluxing continued for an additional 6 hours. After chilling and filtering, the filtrate is evaporated to dryness, the residue taken up in ether and the ether evaporated. The 4-(2-dimethylaminopropyl)-5,6-tetramethylene-2,3-dihydro-1,4-thiazine-3-one of the formula:

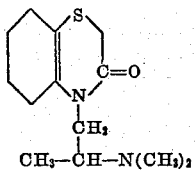

distills at 128°/0.1 mm.

Example 5

To a solution of 3.38 g. of 5,6-tetramethylene-1,4-thiazine-3-one in 100 ml. of boiling toluene is added 0.48 g. of sodium hydride and the mixture refluxed for 45 minutes. After cooling to 40° 4.2 g. of methyliodide is added and refluxing continued for an additional 6 hours. The reaction mixture is chilled and filtered, the filtrate is evaporated to dryness, the residue taken up in ether and the solvent distilled off. The 4-methyl-5,6-tetramethylene-2,3-dihydro-1,4-thiazine-3-one of the formula:

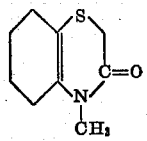

distills at 116–118°/0.2 mm.

Example 6

The sodium salt of 3.38 g. of 5,6-tetramethylene-1,4-thiazine-3-one and 2.43 g. of 3-dimethylaminopropylchloride are reacted and the reaction mixture worked up as described in Example 4. The 4-(3-dimethylaminopropyl)-5,6-tetramethylene-2,3-dihydro-1,4-thiazine-3-one of the formula:

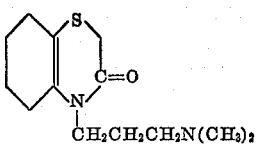

distills at 142–144°/0.3 mm.

Example 7

To a solution of 3.38 g. of 5,6-tetramethylene-2,3-dihydro-1,4-thiazine-3-one in 50 ml. of toluene is added 0.48 g. of sodium hydride and the mixture is refluxed for two hours. A molar equivalent of β-piperidino-(N)-ethylchloride is added and refluxing continued for an additional 8 hours. The solution is filtered, the toluene evaporated and the residue taken up in ether. After evaporation of the ether the 4-(2-piperidino-(N)-ethyl)-5,6-tetramethylene-2,3-dihydro-1,4-thiazine-3-one of the formula:

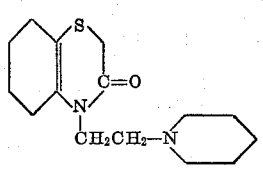

is distilled, B.P. 128–130°/0.3 mm.

The methiodide is formed by treating a solution of the 4-(2-piperidino-(N)-ethyl)-5,6 - tetramethylene-2,3-dihydro-1,4-thiazine-3-one in acetone with methyliodide; the crystalline product melts at 228–230°.

Example 8

A mixture of the sodium salt of 5,6-tetramethylene-2,3-dihydro-1,4-thiazine-3-one prepared by reaction of a solution of 3.38 g. of the free compound in 50 ml. toluene with 0.48 g. sodium hydride, and 3.44 g. of 4-methyl-1-(β-chloroethyl)-piperazine in toluene is reacted as described in Example 7. The residue obtained after treatment with ether is dissolved in acetone, methyliodide is added and the dimethiodide of 4-{2-[4-methyl-piperazino-(N)]-ethyl}-5,6-tetramethylene-2,3-dihydro - 1,4-thiazine-3-one of the formula:

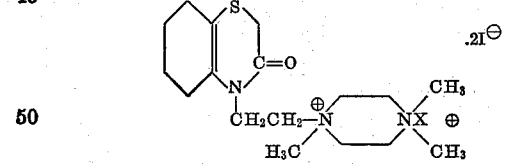

collected, M.P. 200°.

Example 9

A mixture of 3.38 g. of 5,6-tetramethylene-2,3-dihydro-1,4-thiazine-3-one and 0.48 g. of sodium hydride is refluxed in 50 ml. of toluene for 2 hours. After the addition of a molar equivalent amount of 3-[4-methyl-piperazino-(N)]-propyl-chloride and refluxing for 48 hours the reaction mixture is worked up as described in Example 7 and the 4-{3-[4-methyl-piperazino-(N)]-propyl}-5,6-tetramethylene - 2,3 - dihydro - 1,4-thiazine-3-one of the formula:

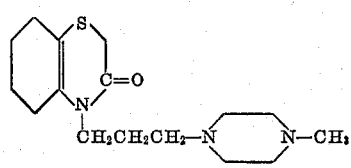

is distilled, B.P. 160–162°/0.2 mm.

Example 10

The sodium salt of 5,6-trimethylene-2,3-dihydro-1,4-thiazine-3-one obtained by reacting the compound described in Example 2 with sodium hydride in toluene, is reacted with an excess of methyl iodide, and after working-up the mixture according to the procedure given in Example 5 the 4-methyl-5,6-trimethylene-2,3-dihydro-1,4-thiazine-3-one of the formula:

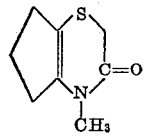

may be obtained by distillation.

*Example 11*

A mixture of 5,6-trimethylene-2,3-dihydro-1,4-thiazine-3-one and an equivalent amount of sodium hydride in toluene is refluxed for 4 hours and after the addition of 2-dimethylamino-ethyl chloride the reaction mixture is worked-up according to the process outlined in Example 7. The resulting 4-(2-dimethyl-amino-ethyl)-5,6-trimethylene-2,3-dihydro-1,4-thiazine-3-one of the formula:

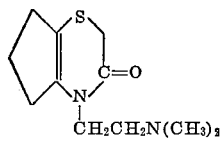

may be obtained in pure form by distillation.

A solution of the 4-(2-dimethylamino-ethyl)-5,6-trimethylene-2,3-dihydro-1,4-thiazine-3-one in a mixture of ether and ethanol is treated with hydrogen chloride gas and upon addition of ether the hydrochloride of 4-(2-dimethylamino-ethyl)-5,6-trimethylene - 2,3 - dihydro-1,4-thiazine-3-one precipitates.

*Example 12*

A mixture of sodium salt of 5,6-pentamethylene-2,3-dihydro-1,4-thiazine-3-one (Example 3) and an excess of methyliodide in toluene is treated according to the procedure outlined in Example 5; the resulting 4-methyl-5,6-pentamethylene-2,3-dihydro-1,4 - thiazine - 3 - one of the formula:

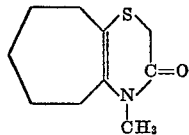

may be purified by distillation.

*Example 13*

A mixture of 2-bromo-4-methyl-cyclohexanone and an equivalent amount of thiolglycolic acid is treated according to the process described in Example 1; the resulting 5,6-(3-methyl-tetramethylene)-2,3-dihydro - 1,4 - thiazine-3-one of the formula:

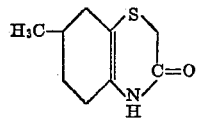

may be obtained by recrystallization from ethanol.

What is claimed is:
1. 5,6-trimethylene-2,3-dihydro-1,4-thiazine-3-one.
2. 5,6-tetramethylene-2,3-dihydro-1,4-thiazine-3-one.
3. 5,6-pentamethylene-2,3-dihydro-1,4-thiazine-3-one.
4. 4 - methyl - 5,6 - tetramethylene - 2,3 - dihydro-1,4-thiazine-3-one.
5. 4 - (3 - dimethylamino - propyl) - 5,6 - tetramethylene-2,3-dihydro-1,4-thiazine-3-one.
6. 4 - (2 - piperidino - (N) - ethyl) - 5,6 - tetramethylene-2,3-dihydro-1,4-thiazine-3-one.
7. In a process for the preparation of 2-$R_1$-4-R-5,6-alkylene-2,3-dihydro-1,4-thiazine-3-ones of the formula:

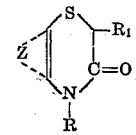

wherein Z stands for an alkylene radical of 3 to 5 carbon atoms as chain members, R stands for a member of the group consisting of hydrogen, lower alkyl, lower hydroxy-alkyl, N,N-di-lower alkyl-amino-lower alkyl and N,N-lower alkylene-imino-lower alkyl, and $R_1$ stands for a member of the group consisting of hydrogen and lower alkyl the step which comprises contacting a 2-halogeno-cycloalkanone, which contains from 5 to 7 ring carbon atoms, with an N-R-2-$R_1$-thiolglycolic acid amide, in which R and $R_1$ have the above given meaning.

8. 2 - $R_1$ - 4 - R - 5,6 - alkylene - 2,3 - dihydro - 1,4-thiazine-3-ones of the formula

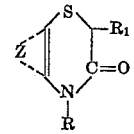

in which the Z stands for an alkylene radical of 3 to 5 carbon atoms as chain members, R stands for a member of the group consisting of hydrogen, lower alkyl, lower hydroxy-alkyl, N,N-di-lower alkyl-amino-lower alkyl and N,N-lower alkylene-imino-lower alkyl, and $R_1$ stands for a member of the group consisting of hydrogen and lower alkyl.

9. Therapeutically useful acid addition salts of compounds of claim 8, in which R represents a member of the group consisting of N,N-di-lower alkyl-amino-lower alkyl and N,N-lower alkylene-imino-lower alkyl.

10. Therapeutically useful lower alkyl quaternary ammonium compounds of compounds of claim 8, in which R represents a member of the group consisting of N,N-di-lower alkyl-amino-lower alkyl and N,N-lower alkylene-imino-lower alkyl.

References Cited in the file of this patent

UNITED STATES PATENTS

| 2,824,102 | Zimmerman | Feb. 18, 1958 |
| 2,851,457 | Zimmerman | Sept. 9, 1958 |

FOREIGN PATENTS

| 447,179 | France | Oct. 21, 1912 |
| 379,318 | Germany | Aug. 20, 1923 |

UNITED STATES PATENT OFFICE
CERTIFICATION OF CORRECTION

Patent No. 2,963,476                          December 6, 1960

George de Stevens

It is hereby certified that error appears in the above numbered patent requiring correction and that the said Letters Patent should read as corrected below.

Column 6, lines 48 to 52, Example 8, for the right-hand portion of the formula reading

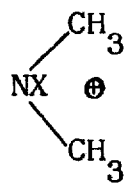       read       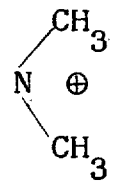

(SEAL)  
Attest:            Signed and sealed this 8th day of August 1961.

ERNEST W. SWIDER  
Attesting Officer

DAVID L. LADD  
Commissioner of Patents